United States Patent
Neoh

(10) Patent No.: US 11,255,382 B2
(45) Date of Patent: Feb. 22, 2022

(54) PLASTIC SLINGER WITH CONTACTING BUMPER FEATURE WITH LABYRINTH

(71) Applicant: Freudenberg-NOK General Partnership, Plymouth, MI (US)

(72) Inventor: Kah Fei Neoh, Dawsonville, GA (US)

(73) Assignee: FREUDENBERG-NOK GENERAL PARTNERSHIP, Plymouth, MI (US)

( * ) Notice: Subject to any disclaimer, the term of this patent is extended or adjusted under 35 U.S.C. 154(b) by 73 days.

(21) Appl. No.: 16/812,360

(22) Filed: Mar. 8, 2020

(65) Prior Publication Data
US 2021/0277951 A1   Sep. 9, 2021

(51) Int. Cl.
*F16C 33/78* (2006.01)
*F16C 33/80* (2006.01)
(Continued)

(52) U.S. Cl.
CPC ...... *F16C 33/7863* (2013.01); *F16C 33/7883* (2013.01); *F16C 33/80* (2013.01);
(Continued)

(58) Field of Classification Search
CPC .............. F16J 15/3264; F16C 33/7863; F16C 33/7883; F16C 33/7886; F16C 33/80; F16C 33/805; B23Q 11/0883
See application file for complete search history.

(56) References Cited

U.S. PATENT DOCUMENTS

| 2,639,954 | A | * | 5/1953 | Potter | F16C 33/784 |
| | | | | | 384/484 |
| 3,021,161 | A | * | 2/1962 | Rhoads | F16J 15/3256 |
| | | | | | 277/568 |

(Continued)

FOREIGN PATENT DOCUMENTS

| CN | 103282146 A | 9/2013 |
| EP | 2728225 A1 | 5/2014 |

(Continued)

OTHER PUBLICATIONS

MJW NPL, Midwest Jeep Willys, https://midwestjeepwillys.com/4797769.html, available https://web.archive.org/web/20171005035940/http://midwestjeepwillys.com/4797769.html (Year: 2017).*

(Continued)

*Primary Examiner* — Nicholas L Foster
(74) *Attorney, Agent, or Firm* — Daniel J. Sepanik; Harness, Dickey & Pierce, P.L.C.

(57) ABSTRACT

A seal assembly includes a housing defining a bore and a shaft received in the bore. A seal member is secured to the housing for sealing a gap between the housing and the shaft. A slinger is secured to the shaft. The slinger being made from plastic and including a first semi-circular part and a second semi-circular part that is secured to the first semi-circular part. The slinger includes a radially extending wall portion with a raised bumper feature at a radially outer surface opposing the seal member. The slinger further includes an axially protruding labyrinth feature extending from the radially extending wall portion and toward the seal member. The first semi-circular part and the second semi-circular part can be snap fit to one another.

3 Claims, 2 Drawing Sheets

Figure 1:
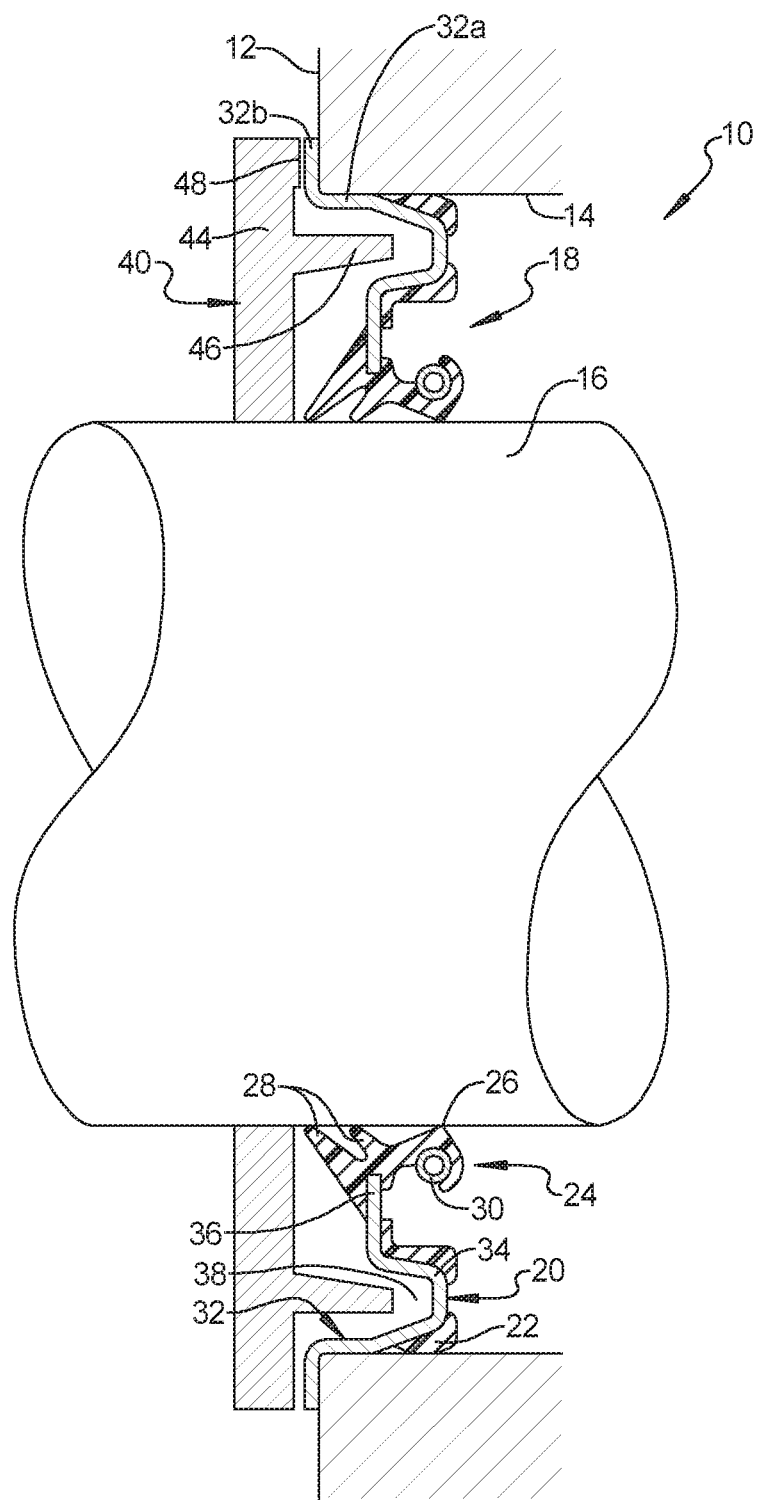

(51) Int. Cl.
*F16J 15/3264* (2016.01)
*B23Q 11/08* (2006.01)

(52) U.S. Cl.
CPC ....... *F16J 15/3264* (2013.01); *B23Q 11/0883* (2013.01); *F16C 33/7886* (2013.01)

(56) References Cited

U.S. PATENT DOCUMENTS

| | | | | |
|---|---|---|---|---|
| 3,510,138 | A * | 5/1970 | Bowen | F16J 15/3264 |
| | | | | 277/571 |
| RE35,309 | E * | 8/1996 | Matsushima | F16J 15/3264 |
| | | | | 277/351 |
| 5,648,614 | A * | 7/1997 | Martsfeld | F16J 15/326 |
| | | | | 73/706 |
| 5,803,169 | A | 9/1998 | Bassinger et al. | |
| 5,979,903 | A * | 11/1999 | Kwasniewski | F16J 15/3256 |
| | | | | 277/423 |
| 5,996,542 | A | 12/1999 | Bathurst | |
| 8,585,296 | B2 * | 11/2013 | Yamaguchi | F16C 33/7859 |
| | | | | 384/484 |
| 9,914,326 | B2 * | 3/2018 | White | F16C 33/80 |
| 10,371,210 | B2 * | 8/2019 | Hargraves | F16C 33/80 |
| 10,711,842 | B2 * | 7/2020 | Liebe | F16C 33/805 |
| 10,927,960 | B2 * | 2/2021 | Bernacchi | F16J 15/3464 |
| 2010/0244388 | A1 * | 9/2010 | Nakagawa | F16C 33/805 |
| | | | | 277/559 |
| 2011/0075958 | A1 * | 3/2011 | Yamaguchi | F16C 33/80 |
| | | | | 384/484 |
| 2012/0027330 | A1 * | 2/2012 | Fetty | F16C 19/386 |
| | | | | 384/477 |
| 2014/0239597 | A1 * | 8/2014 | White | B60B 27/0073 |
| | | | | 277/352 |
| 2015/0377299 | A1 * | 12/2015 | Varnoux | F16C 33/7866 |
| | | | | 384/479 |
| 2016/0363169 | A1 * | 12/2016 | Tahara | F16C 33/7823 |
| 2016/0363170 | A1 | 12/2016 | Nakata | |
| 2018/0355918 | A1 * | 12/2018 | Hargraves | F16C 33/7816 |
| 2019/0226584 | A1 * | 7/2019 | Cabaj | F16J 15/3232 |
| 2019/0360532 | A1 * | 11/2019 | Liebe | F16J 15/3268 |
| 2021/0040991 | A1 * | 2/2021 | Fetty | F16C 19/386 |

FOREIGN PATENT DOCUMENTS

GB 2526545 A 12/2015
WO 2017/038751 A1 3/2017

OTHER PUBLICATIONS

Mercedes AMG slinger, Part No. A2303530190 (dated 2015).
Extended European Search Report dated Aug. 6, 2021 (corresponding to EP21160368.3).

\* cited by examiner

PLASTIC SLINGER WITH CONTACTING BUMPER FEATURE WITH LABYRINTH

FIELD

The present disclosure relates to a plastic slinger with a contacting bumper feature with labyrinth.

BACKGROUND

This section provides background information related to the present disclosure which is not necessarily prior art.

Sealing arrangements are commonly used between a shaft and a housing in order to prevent water and debris from entering the lubricated area on an inboard side of the sealing arrangement. Slingers have been used with the sealing arrangement and have been secured to the shaft and include a radially extending portion that can additionally shield the elastomeric seal from water and debris.

SUMMARY

This section provides a general summary of the disclosure, and is not a comprehensive disclosure of its full scope or all of its features.

A seal assembly includes a housing defining a bore and a shaft received in the bore. A seal member is secured to the housing for sealing a gap between the housing and the shaft. A slinger is secured to the shaft. The slinger being made from plastic and including a first semi-circular part and a second semi-circular part that is secured to the first semi-circular part.

According to a further aspect, the slinger includes a radially extending wall portion with a raised bumper feature at a radially outer surface opposing the seal member.

According to a further aspect, the slinger includes a radially extending wall portion and an axially protruding labyrinth feature extending from the radially extending wall portion and toward the seal member.

According to a further aspect, the first semi-circular part and the second semi-circular part are snap fit to one another.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 2:
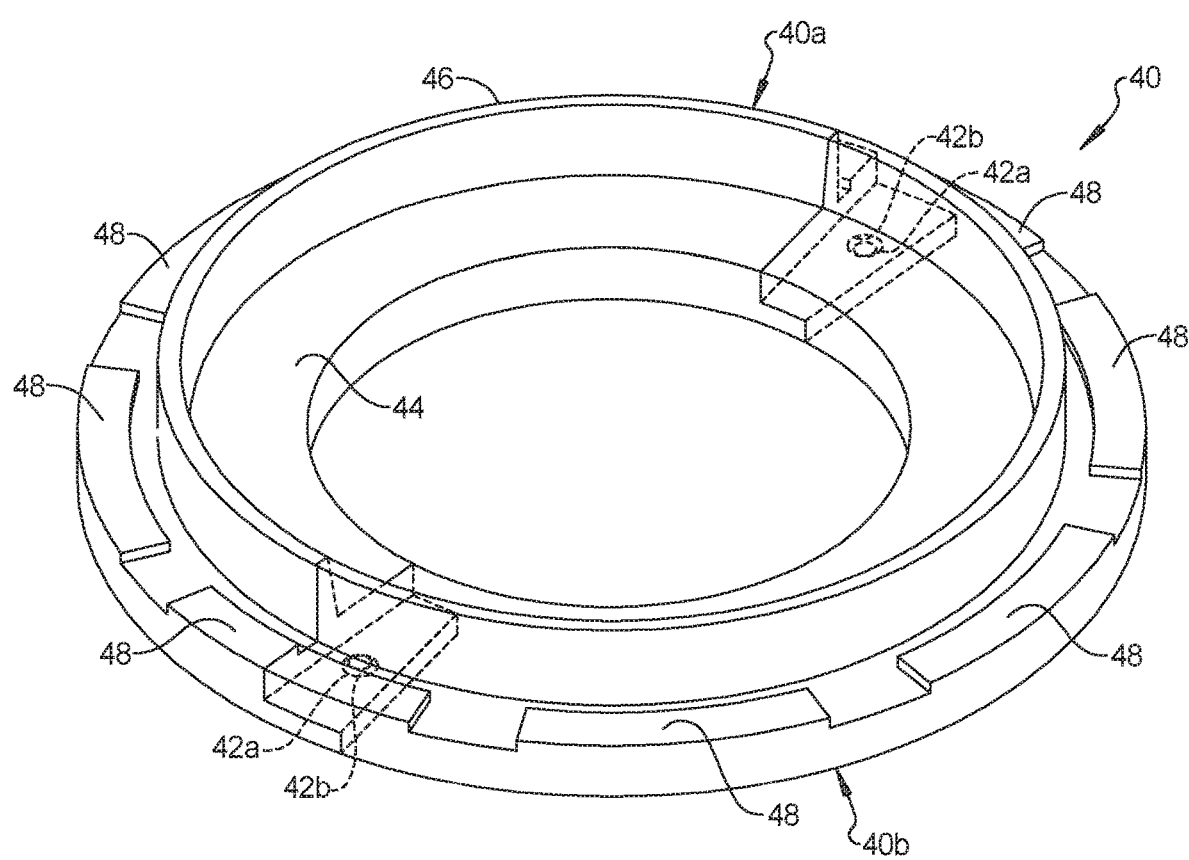

FIG. 1 is a cross-sectional view of a sealing arrangement according to the principles of the present disclosure; and FIG. 2 is a perspective view of a two-piece plastic slinger according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, etc. may be used herein to describe various elements, components, regions, layers and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

With reference to FIG. 1, a seal assembly 10 is shown including a housing 12 defining a bore 14. A shaft 16 is disposed in the bore 14. A seal 18 is secured to the housing 12 for sealing a gap between the housing 12 and the shaft 16. The seal 18 includes a retainer 20 that is over-molded with a seal body that includes a static seal portion 22 that engages the housing 12 and a dynamic seal portion 24 including radial seal lip 26 and one or more dust lips 28 that engage the shaft 16. The radial seal lip 26 can include a recessed garter spring 30.

The retainer 20 can be made from metal and can include a housing engaging portion 32 including a barrel portion 32a and a radially outwardly extending flange portion 32b. The retainer further includes an intermediate portion 34 and a dynamic seal support portion 36. The intermediate portion 34 can include a C-shaped section defining an annular internal cavity region 38. The dynamic seal support portion 36 extends radially inwardly from the intermediate portion 34.

A slinger 40 is secured to the shaft 16 and opposing the seal 18. The slinger 40 can be formed from plastic and, as best shown in FIG. 2, includes a first semi-circular part 40a and a second semi-circular part 40b that is secured to the first semi-circular part 40a. The first semi-circular part 40a and the second semi-circular part 40b can be snap fit to one another using integrally formed male and female snap fit connecting portions 42a, 42b. Alternatively, the first and second semi-circular parts can be secured to one another using fasteners or other connectors. The slinger 40 includes a radially extending wall portion 44 and an axially protruding labyrinth feature 46 extending from the radially extending wall portion 44 and toward the seal 18 and into the internal cavity region 38. The radially extending wall portion 44 further includes a series of raised bumpers 48 at a radially outer surface opposing the seal 18. The combination of these features are designed to exclude and suspend liquids/mud slurry (especially half shaft level fluid submersion) by the centrifugal force. This can prevent liquids/mud slurry from getting into the annular internal cavity region 38 at certain dynamic conditions such as high rotational speed. The raised bumpers 48 are spaced from one another in a circumferential direction and can be used for both rotational directions. The gap between the raised bumpers 48 tend to provide drainage pathway for the trapped slurry/liquid and keep them out from the annular internal cavity region 38.

The plastic slinger 40 allows the contacting bumper features 48 and the labyrinth feature 46 to be molded easily to provide good contaminant exclusion performance. The plastic slinger 40 provides a low friction plastic to metal interface with the extended flange portion 32b on housing 12. The two piece split slinger 40 design can be mounted easily and reduces stack issues for the installation process. The installation process can be done by snap fitting the two split pieces together. This can enable zero gap condition to be achievable and reduce stack variance issues. A zero gap or very small gap (less than or equal to 1 mm) between the raised bumpers 48 and the opposing surface of the seal or housing can be achieved by the two piece split design without tolerance issues. A rubber over-mold can be provided on the plastic slinger 40 to provide a good fitting between the slinger 40 and the shaft 16 and provide good impact resistance towards stone chips and other rigid contaminants.

The labyrinth feature 46 helps to keep slurry/liquid, that gets through the bumper gap, away from the seal. This might happen when the rotation is slow. The design and location of the labyrinth feature 46 of the slinger 40 can be selected to interact with alternative existing seal designs.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A seal assembly, comprising:
   a housing defining a bore;
   a shaft received in the bore;
   a seal member supported by a retainer that is secured to the housing for sealing a gap between the housing and the shaft, the retainer including an annular cavity region; and
   a slinger secured to the shaft, the slinger being made from plastic and being segmented into a first semi-circular part and a second semi-circular part that is secured to the first semi-circular part, wherein the slinger includes a radially extending wall portion including a plurality of circumferentially spaced bumpers at a radially outer surface opposing the seal member, wherein the slinger includes an axially protruding labyrinth feature extending from the radially extending wall portion and into the annular cavity region of the retainer.

2. The seal assembly according to claim 1, wherein the first semi-circular part and the second semi-circular part are snap fit to one another.

3. A method of installing a seal assembly between a shaft and a housing comprising:
   securing a seal member to the housing by a retainer having an annular cavity region;
   inserting the shaft through the seal member;
   snap fitting a two-piece plastic slinger around the shaft adjacent to the seal member, the two-piece plastic slinger being segmented into a first semi-circular part and a second semi-circular part that is secured to the first semi-circular part, wherein the slinger includes a radially extending wall portion including a plurality of circumferentially spaced bumpers at a radially outer surface opposing the seal member, wherein the slinger includes an axially protruding labyrinth feature extending from the radially extending wall portion and into the annular cavity region of the seal retainer.

* * * * *